Patented Nov. 28, 1944

2,363,905

UNITED STATES PATENT OFFICE 2,363,905

AZO PIGMENTS OF THE PHTHALOCYANINE SERIES

James William Libby, Jr., Louisville, Ky., and Harold Edward Woodward, Penns Grove, N. J., assignors to E. I. du Pont de Nemours & Company, Wilmington, Del., a corporation of Delaware No Drawing. Application January 8, 1943, Serial No. 471,730

12 Claims. (Cl. 8—42)

This invention relates to azo-pigments of the phthalocyanine series. More particularly, this invention is concerned with the preparation of metallized derivatives of phthalocyanine-azo compounds, both in substance and on the fiber.

It is an object of this invention to provide new colors of the azo-phthalocyanine class, characterized by valuable shades and excellent light fastness. Another object of this invention is to provide methods of preparation of these pigments. Still another object is to provide a method for producing dyeings on cellulose fibers which are fast to both light and washing. Other and further important objects of this invention will appear as the description proceeds.

In copending application of N. H. Haddock, Serial No. 451,076 (Patent No. 2,351,119), water-insoluble azo pigments of the phthalocyanine series are described, which are formed by azotizing various amino-phthalocyanines and coupling, in substance, to azo coupling components devoid of water-solubilizing groups. In copending application of H. Blackshaw and N. H. Haddock, Serial No. 444,107 (Patent No. 2,339,740), coloring matters of the same class are produced on the fiber, by impregnating cellulosic fiber with a solution of an azotized amino-phthalocyanine, followed by coupling on the fiber, that is, developing with an azo coupling component devoid of water-solubilizing groups, such as carboxy and sulfonic acid. The washing fastness of the dyeings so produced is excellent. The light fastness of these pigments, produced both in substance and on the fiber, varies from fair to good, depending upon the coupling components involved.

Now, we have found that if azo-phthalocyanine compounds are formed in substance or on the fiber according to either of the above applications, and are then treated with aqueous solutions of compounds of metals capable of forming metallic complexes with ortho-hydroxy-azo dyes, new metal complex azo pigments of the phthalocyanine series are formed, which are in general faster to light than the unmetallized pigments.

Any of the amino-phthalocyanines mentioned in copending application Serial No. 444,107 (Patent No. 2,339,740) may be used as the diazo component in the preparation of the pigments or dyeings which are to be metallized. For example: The (3)- and (4)- di-, tri- and tetra-amino derivatives of metal-free phthalocyanine, copper phthalocyanine, cobalt phthalocyanine, and nickel phthalocyanine are useful for the purposes of this invention. The coupling components suitable for use are those in which coupling occurs in a position adjacent to a hydroxy group, or an enolizable keto group, or a group which together with the azo bond constitutes a lake-forming group. As examples of satisfactory coupling components, there may be mentioned: 1-naphthol, 2-naphthol, p-cresol, any of the various arylamides of 2,3-hydroxy-naphthoic acid, the pyrazolones, the aceto-acet-arylides, the hydroxy-quinolines, etc.

A preferred embodiment of the invention involves the use of sufficient nitrite to azotize all of the available amino groups of the polyamino-phthalocyanine employed; but satisfactory dyeings, with for example tetra-amino-phthalocyanine, may be obtained also by using less than four moles of nitrous acid for every mole of tetra-amino-phthalocyanine. As an example, a satisfactory dyeing suitable for metallization may be obtained by azotizing tetra-amino-copper-phthalocyanine with sufficient nitrite to azotize only three of the amino groups, impregnating the fiber with said azotized amino-phthalocyanine, and coupling it thereon with for example 2-naphthol. In this connection, it should be borne in mind that the polydiazonium phthalocyanines are not particularly stable, and even where sufficient nitrite is used to azotize all of the amino groups, decomposition of some of the diazo groups may take place prior to complete coupling; thus, in the case of tetra-amino-copper-phthalocyanine, for instance, the actual dyeing on the fiber may under circumstances be a mixture of the tetrakisazo, trisazo, disazo and even monoazo derivatives of the phthalocyanine compound.

When our invention is applied to the development of color on the fiber, both dyeing and printing procedures may be employed. More particularly, any one of the following methods may be used:

1. The fiber may be impregnated with a solution of the azotized polyamino-phthalocyanine and then treated with an alkaline solution of the appropriate coupling component.

2. The fiber may be prepadded with a solution of a cellulose substantive coupling component, as for example, an arylamide of 2,3-hydroxy-naphthoic acid and then treated with a solution of an azotized polyamino-phthalocyanine, the pH of which has been raised above Congo Red neutrality with sodium acetate.

3. The fiber may be printed with a solution of an azotized polyamino-phthalocyanine which has been thickened with an ordinary printing paste thickener, such as gum tragacanth; said printing may then be aftertreated in an aqueous alkaline bath containing a suitable coupling component.

4. Cellulose fiber which has been prepadded with the coupling component as in method 2 may be printed with a thickened solution of an azotized polyamino phthalocyanine prepared as in the preceding paragraph.

Instead of using freshly prepared solutions of azotized amino-phthalocyanine for the purpose of impregnating cellulose fiber, there may be employed solutions prepared by dissolving in water phthalocyanine diazonium compounds which have been stabilized in dry form by conversion to the inorganic double salts, isodiazotates, etc. See, for instance, copending application of N. H. Haddock, Serial No. 443,668 (Patent No. 2,349,090).

The metallizing agents suitable for use with the present invention include water-soluble compound of metals capable of forming complex compounds; for example, the water-soluble salts of copper, cobalt, nickel and chromium, or more generally, metals of atomic weights between 51 and 64. As practical examples of such water-soluble salts may be mentioned copper acetate, copper sulfate, cuprammonium sulfate, copper chloride, nickel acetate, cobalt acetate, cobalt chloride, chromium acetate and chromium fluoride.

The dyeings are aftertreated in aqueous baths containing one or more of the said metallic agents for from about 10 to about 60 minutes at temperatures which may range from about room temperature to about the boiling point of the bath. The volume of the aftertreating bath is not particularly critical, but sufficient volume should be employed so that the dyeing is completely covered for essentially the major portion of the aftertreating procedure. The amount of the metallizing agent used may be varied within reasonable limits, but there is normally employed a weight equivalent to from about 1% to about 10% of the weight of the fabric being aftertreated. The pH of the bath should not be reduced below the value obtainable by merely dissolving the metallic salt in neutral water.

The following examples are given to illustrate the invention but without intent to limit it in any way. Parts are by weight of 100% material except where otherwise specified.

Example I

To 2.75 parts of a 9% aqueous slurry of copper-tetra-(4)-amino-phthalocyanine were added 6.3 parts of 10-normal hydrochloric acid, and sufficient ice to reduce the temperature to approximately 5° C. Then 1 part of 2-normal sodium nitrite was added and the resulting solution stirred for one hour at 0°–5° C. At the end of that time, the solution was filtered and diluted to 175 parts with water. Five parts of cotton piece-goods were turned in this solution, held at 0°–5° C. for one hour. The piece was then removed, rinsed in cold water and aftertreated in a bath consisting of 250 parts of water, 0.2 part of 2-naphthol, 1 part of 2-normal sodium hydroxide solution and 1 part of 2-normal sodium carbonate solution for 15 minutes. The dyed fabric was then aftertreated at 90° C. for 20 minutes in a bath consisting of 200 parts of water and 0.26 part of copper acetate. The dyeing obtained was a chocolate-brown shade and had excellent washing fastness and light fastness.

If, in place of the copper acetate used in the above aftertreating bath, nickel acetate, cobalt acetate or chromium acetate is used, a dyeing of similar shade with excellent washing and light fastness is obtained.

Example II

Five parts of cotton piece-goods were impregnated with the solution of azotized tetra-(4)-amino-copper-phthalo-cyanine in the same manner as in Example I. The piece so impregnated was then aftertreated in a bath consisting of 250 parts of water, 0.2 part of 8-hydroxy-quinoline, 1 part of 2-normal sodium hydroxide, and 1 part of 2-normal sodium carbonate at room temperature for a period of 15 minutes.

The dyed fabric was then aftertreated for 15 minutes at the boil in a bath consisting of 200 parts of water, 0.25 parts of copper acetate, and sufficient ammonia to redissolve the copper hydroxide at first precipitated by the addition of ammonia. The dyeing obtained was a dull gray shade with excellent washing fastness and excellent light fastness. Dyeings of similar shade with excellent light and washing fastness are obtained if the copper acetate plus ammonia used in the above aftertreating bath is replaced by an amount of nickel acetate, cobalt acetate or chromium acetate equivalent to the copper acetate.

Example III

Tetra-(4)-amino-copper-phthalocyanine was azotized and used to dye five parts of cotton piece-goods in a manner similar to that described in Example I. The dyeing was then aftertreated for 15 minutes at 5–10° C. in a bath consisting of 250 parts of water, 0.4 part of aceto-acet-p-phenetidide, 1 part of 2-normal sodium hydroxide and 1 part of 2-normal sodium carbonate. The green dyeing resulting had excellent washing fastness and good light fastness. One-half of this dyeing was then treated in an aftertreating bath containing copper acetate as described in Example I. The dyeing, a dull green shade, had excellent washing fastness and light fastness.

If in place of the copper acetate of the above-mentioned bath nickel acetate, cobalt acetate or chromium acetate is used in equal weight, dyeings of similar shade and similarly excellent washing and light fastness are obtained.

In the following table are listed shades of other dyeings made from azotized amino phthalocyanine and azo coupling components devoid of water-solubilizing groups such as carboxy and sulfonic acids, the dyeings being made in manners analogous to those described in the preceding examples. The amino phthalocyanines used in these cases, as well as the coupling components and after-metallizing baths employed, are listed. The shades are indicated. The washing fastness in all cases is excellent, and the light fastness ranges from very good to excellent.

| Ex. | Azotized tetra-amino-copper-phthalocyanine treated on the fiber with— | Then treated with— | Shade |
|---|---|---|---|
| IV | para-Cresol | Copper acetate | Dull green. |
| V | do | Nickel acetate | Green. |
| VI | do | Cobalt acetate | Do. |
| VII | do | Chromium acetate | Do. |
| VIII | 1-phenyl-3-methyl-5-pyrazolone | Copper acetate | Dull green. |
| IX | do | Nickel acetate | Drab green. |
| X | do | Cobalt acetate | Do. |
| XI | do | Chromium acetate | Do. |
| XII | 8-hydroxy-quinoline | Copper acetate | Green gray. |
| XIII | para-Cresol | do | Dull green gray. |

Example XIV

To a slurry of 159 parts of tetra-(4)-amino-copper phthalocyanine in 1500 parts of water there were added 1000 parts of concentrated hydrochloric acid. After stirring 1 hour, the slurry was iced to 0° C. and 69 parts of sodium nitrite were added. After stirring about 15 minutes at 5° C. the green solution was filtered. It was run into a solution of 170 parts of 2,4-dihydroxy-quinoline and 42 parts of sodium hydroxide and 106 parts of sodium carbonate in 3000 parts of water. While the solution of the diazonium compound was entering the solution of dihydroxy quinoline, ice was added to keep the temperature at 10° C. and 260 parts of sodium hydroxide were added to keep the solution slightly alkaline to Brilliant Yellow paper. The pigment was filtered and washed, then slurried in about 3000 parts of water. A solution comprising 400 parts of ammonium hydroxide (sp. gr. 0.8) and 550 parts of molar copper sulfate was then added and the mixture was heated at 90° C. for 3 hours. The pigment was filtered and washed.

A dried portion of this pigment was milled in lithographic varnish, and the dark green ink obtained was found to possess excellent light fastness in masstone and undertone. A zinc oxide tint of this ink had a strong, dull green shade and good light fastness.

A portion of this pigment was incorporated in a water-in-lacquer emulsion, the lacquer phase of which contained a pigment binding agent, and the emulsion was printed on cotton and baked at 150° C. for 5 minutes. A dark green print was obtained which was fast to soaping and had excellent light fastness.

*Example XV*

When an equivalent amount of nickel chloride was used in place of the copper sulfate in Example XIV, a similar pigment was obtained. This nickel compound had better fastness to light when used to tint a zinc oxide ink.

*Example XVI*

When 152 parts of 8-hydroxy-quinoline were used in place of 170 parts of 2,4-dihydroxy-quinoline in Examples XIV and XV, pigments were obtained which gave gray inks and textile prints of good light fastness. These grays were more nearly neutral than the greenish gray of the unmetallized pigment.

*Example XVII*

A solution of the diazonium compound was prepared as in Example XIV. To this was added a solution of 180 parts of 1-phenyl-3-methyl-5-pyrazolone in 500 parts of water and 44 parts of hydrochloric acid (100%). Then 136 parts of sodium acetate crystals were added and enough sodium hydroxide (about 260 parts) to make the solution neutral to Congo red. The pigment was filtered, then treated with copper ammonium sulfate as in Example XIV. The pigment gave dark green inks and textile prints of very good fastness to light.

*Example XVIII*

When 150 parts of beta-naphthol were used in place of 170 parts of 2,4-dihydroxy-quinoline in Examples XIV and XV, pigments were obtained which gave strong, gray inks and textile prints of good light fastness.

It will be understood that the above examples are merely illustrative and that the details may be varied liberally within the skill of those engaged in this art. Thus, in Examples XIV to XVIII inclusive, the 400 parts of ammonium hydroxide solution may be replaced by 272 parts of sodium acetate crystals. If acetates of the metals are used instead of chlorides or sulfates, the metallization may be carried out without the addition of ammonium hydroxide or sodium acetate. Other details in the above examples, such as concentration, temperature and time in the diazotization, coupling and metallization may be varied within reasonable limits without affecting the results obtained.

In the claims below, the expression "azoic coupling component" shall be understood as referred to coupling components which are free of water-solubilizing groups (such as sulfonic or carboxylic) as typified by the naphthols, the cresols, the arylamides of 2,3-hydroxy-naphthoic acid, the non-sulfonated aryl-methyl-pyrazolones, the aceto-acetarylides, and the hydroxy-quinolines.

We claim:

1. A metal complex form of an azo coloring compound of the general formula

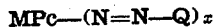
MPc—(N=N—Q)$_x$ wherein MPc designates the radical of a phthalocyanine compound selected from the group consisting of metal-free phthalocyanine and metal-phthalocyanines, Q is the radical of an azoic coupling component, while $x$ is a number not greater than 4, the metal in said metal complex form being a member of the group consisting of copper, nickel, cobalt and chromium and being present in addition to any metal atoms which may be present as part of the phthalocyanine radical.

2. A metal complex form of an azo coloring compound of the general formula

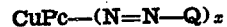
CuPc—(N=N—Q)$_x$ wherein CuPc designates the radical of copper phthalocyanine, Q is the radical of an azoic coupling component, while $x$ is a number not greater than 4, the metal in said metal complex form being a member of the group consisting of copper, nickel, cobalt and chromium and being present in addition to the copper atom in the CuPc radical above defined.

3. Textile fiber being colored with a metal complex form of an azo-pigment of the phthalocyanine series as defined in claim 1.

4. Cellulosic textile fiber having developed on the fiber a metal complex form of a copper-phthalocyanine azo compound as defined in claim 2.

5. The process of producing novel coloring matters of the phthalocyanine series, which comprises reacting with a water-soluble compound of a metal whose atomic weight is between 51 and 64 upon an azo compound of the phthalocyanine series obtained by coupling an azotized polyamino-phthalocyanine to an azoic coupling component.

6. The process of producing novel coloring matters of the phthalocyanine series, which comprises reacting with a water-soluble salt of a metal from the group consisting of copper, nickel, cobalt and chromium upon an azo compound obtained by coupling an azotized tetra-amino-copper-phthalocyanine to an azoic coupling component.

7. The process of coloring textile fiber, which comprises developing on the fiber an azo dye by coupling on the fiber an azotized polyamino-phthalocyanine to an azoic coupling component, and then treating the dyed fiber with a water-soluble compound of a metal whose atomic weight is between 51 and 64, to metallize the azo dye on the fiber.

8. The process of coloring cellulose fiber which comprises developing on the fiber an azo dye by coupling on the fiber an azotized polyamino copper-phthalocyanine with an azoic coupling component, and then treating the dyed fiber with a water-soluble salt of a metal selected from the group consisting of copper, nickel, cobalt and chromium to metallize the azo dye on the fiber.

9. The process of dyeing cellulosic textile material, which comprises impregnating the material with a solution of azotized copper-tetra-amino-phthalocyanine, then treating the impregnated material with a developing bath containing an azoic coupling component, to produce an azo dye on the fiber, and finally treating the dyed material with an aqueous solution of a salt of a metal selected from the group consisting of copper, nickel, cobalt and chromium to metallize the azo dye on the fiber.

10. The nickel complex of a phthalocyanine azo dye obtained by coupling an azotized tetra-amino-copper-phthalocyanine to 2,4-dihydroxy-quinoline.

11. Textile material colored with a metallized azo-phthalocyanine dye obtained by padding the textile material with an azotized polyamino-phthalocyanine, developing on the fiber with 8-hydroxy-quinoline and metallizing the azo dye on the fiber by treatment with an aqueous solution of a water-soluble compound of copper.

12. Textile material colored with a metallized azo-phthalocyanine dye obtained by padding the textile material with an azotized polyamino-phthalocyanine, developing on the fiber with 2-naphthol and metallizing the azo dye on the fiber by treatment with an aqueous solution of a water-soluble compound of copper.

JAMES WILLIAM LIBBY, Jr.
HAROLD EDWARD WOODWARD.